United States Patent
Tseng et al.

(10) Patent No.: US 11,418,818 B1
(45) Date of Patent: Aug. 16, 2022

(54) SYSTEM FOR CONTROLLING STORAGE OF RESPONSE DATA

(71) Applicant: AMAZON TECHNOLOGIES, INC., Seattle, WA (US)

(72) Inventors: Jui Te Tseng, Seattle, WA (US); Forrest MacKenzie Vines, Bonney Lake, WA (US); Ruiqi Cheng, Seattle, WA (US); Xingbang Tian, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 132 days.

(21) Appl. No.: 16/676,796

(22) Filed: Nov. 7, 2019

(51) Int. Cl.
*H04N 21/231* (2011.01)
*H04N 21/222* (2011.01)
*H04N 21/462* (2011.01)
*H04N 21/433* (2011.01)

(52) U.S. Cl.
CPC ..... *H04N 21/23106* (2013.01); *H04N 21/222* (2013.01); *H04N 21/4331* (2013.01); *H04N 21/4621* (2013.01)

(58) Field of Classification Search
CPC ........... H04N 21/23106; H04N 21/222; H04N 21/4331; H04N 21/4621
USPC .......................................................... 725/91
See application file for complete search history.

(56) References Cited

U.S. PATENT DOCUMENTS

| 9,537,888 | B1 * | 1/2017 | McClintock | H04L 41/06 |
| 9,948,740 | B1 * | 4/2018 | Benson | H04L 67/1097 |
| 10,514,967 | B2 * | 12/2019 | McClory | H04L 63/0281 |
| 2015/0381700 | A1 * | 12/2015 | Zhang | G06F 12/0866 709/219 |
| 2018/0213053 | A1 * | 7/2018 | Yeager | H04L 67/1014 |

* cited by examiner

*Primary Examiner* — Alfonso Castro
(74) *Attorney, Agent, or Firm* — Lindauer Law, PLLC

(57) ABSTRACT

To determine whether a request or an associated response is cached, the request may be received by a first server associated with a Content Delivery Network (CDN). Based on configuration data for the server, a header is generated based on characteristics of the request, indicating that a response associated with the request is able to be cached. A second server associated with generation of a response receives the request. In response to the header, the second server generates a caching determination based on configuration data and the characteristics of the request. When the first server receives the response and the caching determination, the response may be stored. Use of the second server to generate caching determinations eliminates the need to change the configuration of devices associated with the CDN while enabling requests from multiple CDN devices to be cached without requiring changes to be deployed to each device.

20 Claims, 8 Drawing Sheets

SYSTEM FOR CONTROLLING STORAGE OF RESPONSE DATA

BACKGROUND

When a request to access content is received and a response to the request is generated, in some cases, at least a portion of the response may be stored in a cache. When a subsequent request is received for which the cached data may be used in a response, use of the cached data may reduce latency and the consumption of computational resources associated with generating and transmitting the response. Determinations regarding whether to store or refrain from storing a response are typically controlled using an "edge" device, such as a server associated with a Content Delivery Network (CDN). However, changing and deploying a configuration for a device associated with a CDN may require a significant length of time, and in many cases, multiple CDN devices may be used to receive requests, each of which must be configured.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
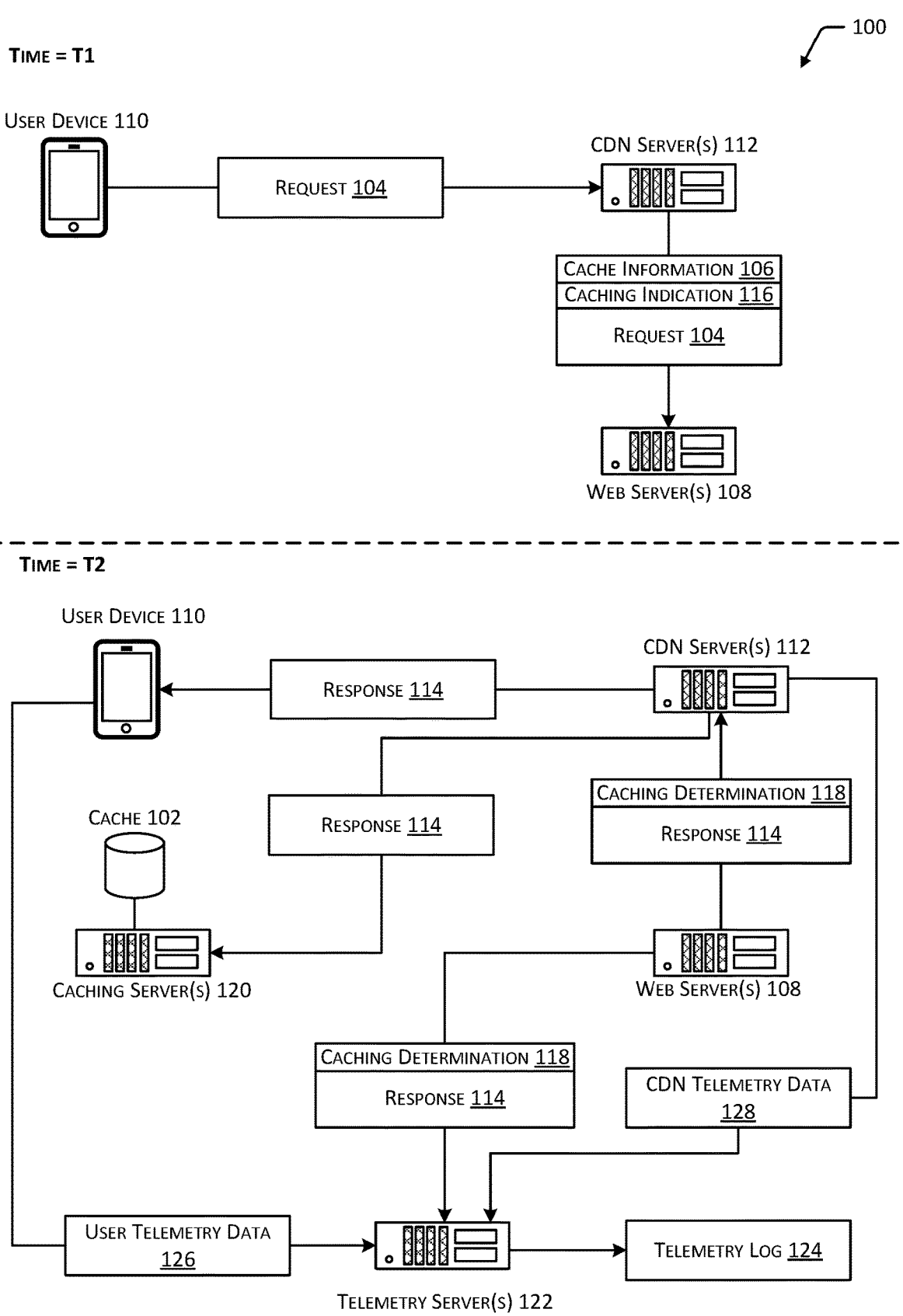
FIG. 1 depicts an implementation of a system for causing storage of responses and in some cases, requests, based on a caching determination generated by one or more web servers.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When a request to access content, such as one or more webpages of a website, is received, a response may be generated and provided to the requesting device. In some cases, to reduce the latency and computational resources associated with generating and transmitting a response, certain types of content may be stored in a cache or other type of data storage. For example, a request may first be received by a Content Delivery Network (CDN), which may store content associated with webpages or other types of responses at a location that is normally geographically close to the requesting device. Content for a response that is stored in association with the CDN may be used in place of generating that content, which may reduce the time and computational resources that would otherwise be used to generate and transmit that content from an origin server or web server. Typically, a CDN will store content that is likely to be reused in subsequent responses in a cache, while refraining from storing content that is unlikely to be reused. For example, portions of a response that include personalized content, such as content that is generated based on a specific requesting device, user account, and so forth may not be stored in a cache, while non-personalized content, such as static elements of a webpage that are presented independent of the requesting device or user account, may be stored. In some cases, such as times when large quantities of traffic are received by a web server, a CDN may be used to provide a non-personalized version of a webpage to a requesting device in place of generating a personalized response to reduce the amount of traffic processed by the web server.

To change the configuration associated with a CDN server or other type of computing device, such as to cause a CDN server to begin storing or cease storing a particular type of content, the changed configuration is typically deployed to the CDN device from a remote device. As a result, reconfiguring a CDN device may require a significant amount of time, hindering the ability to rapidly or frequently change the configuration of CDN devices. Additionally, a single origin server for a website may receive requests from, and provide responses to, a potentially large number of CDN devices, each of which must be reconfigured, further increasing the time and computational resources necessary for such a process.

Described in this disclosure are techniques for controlling the criteria regarding storage of responses and requests rapidly, without requiring deployment of configurations to multiple CDN devices. When a request is received using a first computing device, such as a server or other type of computing device associated with a CDN, the first computing device may determine one or more characteristics of the request. Example characteristics of the request may include an identifier indicative of the computing device or user account from which the request was provided, a user type associated with the user account, hardware or software components of the requesting device, a location of the requesting device, a transmission route (e.g., a network path) by which the request was transmitted from the requesting device to the CDN device, a latency associated with transmission of the request, a type of content associated with the request or with the associated response, or a time at which the request was received (e.g., a time that corresponds to peak traffic versus a time that corresponds to low traffic). Based on configuration data associated with the first computing device, a caching indication may be associated with the request. The caching indication may indicate whether the request or a response associated with the request corresponds to a particular type of content that is suitable for storage, such as in a cache. For example, the configuration data for a CDN device may indicate particular types of requests that are likely to cause generation of responses that include non-personalized content that is suitable for caching. In addition to the caching indication, the first computing device may associate other information, such as a cache key and a transmission route, with the request. For example, the caching indication, the cache key, and the transmission route may be indicated in a header that is transmitted with the request. In cases where the characteristics of a request do not correspond to the configuration data for the first computing device, a caching indication may be omitted, or an indication that the request does not correspond to content suitable for storage may be included.

A second computing device, such as a web server or origin server, may receive the request and caching indication from the first computing device. In cases where a request does not include a caching indication or includes an indication that the request does not correspond to suitable content, a response may be generated by the second computing device or another computing device in communication therewith without causing storage of the request or response. However, when a request associated with a caching indication is received, in response to the caching indication the second computing device may associate a caching determination with the request based on the characteristics of the request. The caching determination may indicate whether the request, a response associated with the request, or particular portions of the request or response are to be stored. For example, configuration data associated with the second computing device may associate caching determinations with request characteristics. In some implementations, the configuration data may associate caching determinations with the cache key or transmission route, or with particular caching indications received from the first computing device. The caching determination may be included in a header associated with the request, which may be then be provided to one or more other computing devices for generation of a response based on the request. The response may retain data indicative of the caching determination, such as in a header. In other implementations, the caching determination may be associated with the response by the second computing device. For example, the second computing device may generate the response or may receive the response from a computing device that generates the response and may associate the caching determination with the response.

When a response that includes a caching determination is received by the first computing device, or another computing device associated with a cache or other type of data storage, at least a portion of the response or at least a portion of the associated request may be stored. For example, a response that includes a caching determination may be provided from a web server or origin server to a server associated with a CDN, which may store at least a portion of the response in a cache prior to providing the response to a requesting device. Use of a second computing device, such as a web server or origin server, to generate caching determinations rather than relying on edge devices, such as CDN servers, to determine whether to store requests or responses, may enable the types of requests and responses that are stored to be modified rapidly by changing the configuration data associated with the second computing device. For example, changes to configuration data associated with an origin server may be made more rapidly than changes to configuration data associated with a CDN server or other type of edge device by avoiding the need to deploy changes to a CDN server. Additionally, changing the configuration data associated with a single origin server may enable the storage of requests and responses associated with multiple CDN servers that communicate with the single origin server to be controlled. For example, first configuration data may be provided to a set of CDN servers that controls the assignment of caching indications to requests at a single time, and may then remain substantially unchanged. Subsequently, second configuration data associated with an origin server that controls association of caching determinations with requests and responses may be changed as needed to control the storage of responses and requests.

In some implementations, in response to a caching determination that is associated with a response, the response may be provided to a clickstream server or other type of computing device associated with generating telemetry log data indicative of the response. For example, if a response is stored in a cache, telemetry log data indicative of the stored response may be generated so that the telemetry log data may be retrieved at a future time when the stored response is provided to a requesting device. Use of caching determinations from the second computing device to cause generation and storage of telemetry log data may enable telemetry logs to be selectively generated and stored based on caching determinations that indicate a response is to be cached, which may save time and computational resources associated with processing every response for the purpose of generating and storing telemetry log data. In some implementations, the telemetry log data may be used to change configuration data associated with one or more of the computing devices. For example, if it is determined, based on the telemetry log data, that a response was stored in a cache when the response includes personalized data, data indicative of an error, or other data that is not suitable for storage, the configuration data associated with the second computing device that generated the caching determination may be changed in response to the telemetry log data.

As one skilled in the art will appreciate in light of this disclosure, certain embodiments may be capable of achieving certain advantages. For example, use of configuration data associated with a web server or origin server may enable the storage of requests and responses in caches or other types of data storage to be controlled at a single source or a small number of sources. Continuing the example, if a single origin server receives requests from, and provides responses to, multiple servers associated with a CDN, changing a configuration associated with the origin server may enable a potentially large number of requests and responses to be processed differently without requiring configurations associated with the CDN servers to be changed. Additionally, changes to a configuration for an origin server may typically be made more rapidly, and thus more frequently, than changes to an edge device, such as a CDN server. As a result, CDN servers or other types of edge devices may be configured a single time to indicate requests associated with potentially cacheable content. Use of edge devices to generate an initial caching indication may reduce the computational resources associated with processing and generating a caching determination for every received request using an origin server. The origin server may then be configured to process requests that include such an indication by generating a caching determination based on particular configurations (such as rules, business logic, etc.), which may be changed as needed by users. Additionally, servers or other types of computing devices associated with generation of clickstream or other types of telemetry log data may generate data associated with a response in response to a caching determination that indicates that a response was stored, reducing the computational resources that would be used if this process were performed for every response.

FIG. 1 depicts an implementation of a system 100 for causing storage of responses in a cache 102 or other type of data storage and in some cases, storage of requests 104, based on cache information 106 (such as a cache key or transmission route) and a caching determination generated by one or more web servers 108. At a first time T1, a user device 110 may provide a request 104 to access content, such as a webpage, associated with the web server(s) 108. The user device 110 may include any type of computing device including, without limitation, a portable computing device such as a laptop computing device, a tablet computing device, a smartphone, or a wearable computing device, a desktop computing device, an automotive computing device, a set top box, a server, and so forth. Additionally, while FIG. 1 depicts a single user device 110, multiple computing devices may generate requests 104. For example, one or more servers may execute services that generate requests 104 to access content associated with the web server(s) 108. The web server(s) 108 may include any number and any type of computing devices, including, without limitation, the types of computing devices described with regard to the user device 110.

Before a request 104 is provided to the web server(s) 108, the request 104 may be routed through other computing devices, such as one or more CDN servers 112. The CDN server(s) 112 may include any number and any type of computing devices, including, without limitation, the types of computing devices described with regard to the user device 110 and web server(s) 108. For example, an edge device, such as a CDN server 112 may receive a request 104 and provide the request to one or more web servers 108, in some cases via one or more intermediate computing devices. In some implementations, the CDN server(s) 112 may process the request 104 prior to providing the request 104 to another computing device, such as by adding data to, or removing data from, the request 104. For example, the CDN server(s) 112 may be associated with a cache or other type of data storage and may store at least a portion of received requests 104 or associated responses 114 in data storage. At a subsequent time, responses 114 associated with stored data may be generated at least in part by accessing the stored data rather than generating and transmitting the content using the web server(s) 108. In some cases, a response 114 may include both data from a cache or other type of data storage and data from the web server(s) 108.

At the first time T1, when the CDN servers(s) 112 receive the request 104, the CDN server(s) 112 may generate a caching indication 116 associated with the request 104. Specifically, the CDN server(s) 112 may determine one or more characteristics of the request 104. For example, a request 104 may include data indicative of the user device 110, a user account associated with the request 104, an identification of particular content to be accessed, and so forth. As such, characteristics of the request 104 may include an identifier indicative of the user device 110 or a user account associated with the request 104, hardware or software components of the user device 110, a transmission route (e.g., a network path) associated with transmission of the request 104 or response 114, user data associated with the user account, a type of content associated with the request 104 or response 114, a time associated with generation or transmission of the request 104 or response 114, latency or other communication metrics associated with transmission of the request 104 or response 114, and so forth. In some cases, the request 104 may include an indication of the request characteristics. In other cases, request characteristics may be determined by analysis of the request 104 or by accessing other sources of data, such as data indicative of the user account associated with the request 104 or the type of content associated with the request 104. Configuration data associated with the CDN server(s) 112 may associate caching indications 116 with corresponding characteristics of the request 104. For example, based on correspondence between the characteristics of the request 104 and the configuration data for the CDN server(s) 112, a particular caching indication 116 that corresponds to the request 104 may be determined.

Caching indications 116 may indicate particular types of requests 104 that may be associated with content that is suitable for storage and reuse, such as in a cache. For example, portions of a response 114 that include non-personalized content may be suitable for storage in a cache associated with the CDN server(s) 112, while portions of the response 114 that include personalized content determined based on the user device 110 or a user account may not be suitable for storage and reuse. In some implementations, requests 104 that are not associated with content suitable for storage and reuse may lack a caching indication 116. In other implementations, such requests 104 may be provided with a caching indication 116 that indicates a lack of suitable content for storage and reuse. In some implementations, the CDN server(s) 112 may also determine one or more of a transmission route or a cache key associated with the request 104 and in some cases, an associated response 114. For example, one or more of the caching indication 116, the cache key, or the transmission route may be included in a header of the request 104. Continuing the example, the CDN server(s) 112 may add or modify the header of the request 104 to include the caching indication 116, cache key, or transmission route prior to providing the request 104 and caching indication 116 to the web server(s) 108.

At a second time T2 subsequent to the first time T1, the web server(s) 108 may receive the request 104 and caching indication 116 from the CDN server(s) 112 and generate a response 114 based on the request 104. For example, the response 114 may include at least a portion of the content indicated in the request 104. Continuing the example, the web server(s) 108 may access a website, database, or other source of content and determine particular data that corresponds to the request 104. At least a portion of the corresponding content may be included in a response 114. In other implementations, the web server(s) 108 may process the request 104 and provide the request 104 to one or more other computing devices for preparation of a response 114. For example, the web server(s) 108 may include an origin server that receives and processes requests 104, then provides requests to other servers associated with particular types of content for generation of responses 114. In cases where the received request 104 lacks a caching indication 116 or includes a caching indication 116 indicating a lack of content suitable for storage and reuse, the response 114 may be provided to the user device 110, in some cases via the CDN server(s) 112 without causing storage of the response 114 or request 104. However, in cases where the request 104 includes a caching indication 116 indicative of content suitable for storage and reuse, the web server(s) 108 may generate a caching determination 118 based on the characteristics of the request 104. The caching determination 118 may be associated with the response 114, such as in a header of the response 114, prior to providing the response to the CDN server(s) 112. In some implementations, in cases where the web server(s) 108 provide the request to one or more other computing devices for generation of the response 114, the request 104 provided to the other computing devices may be associated with the caching determination 118, or the response 114 received from the other computing devices may be associated with the caching determination 118.

In response to receiving a request 104 associated with a caching indication 116 that indicates content suitable for storage and reuse, the web server(s) 108 may determine correspondence between characteristics of the request 104 and configuration data for the web server(s) 108 that associates request characteristics with caching determinations 118. The caching determination 118 may indicate that data associated with the response 114, and in some cases, data associated with the corresponding request 104, may be stored in a cache or other type of data storage. In some cases, the caching determination 118 may indicate a particular portion of a response 114 that is to be stored. In other cases, the entire response 114 may be stored. In some implementations, if a response 114 or corresponding request 104 is not to be stored, a caching determination 118 may be omitted. In other cases, a caching determination 118 indicating that the response 114 is not to be stored may be associated with the response 114.

The CDN server(s) 112 may receive the response 114 and caching determination 118 from the web server(s) 108. In addition to providing the response 114 to the user device 110, if the response 114 is associated with a caching determination 118 that indicates that the response 114 or associated request 104 is to be stored, the CDN server(s) 112 may provide the response 114 or associated request 104 to a cache or other type of data storage. For example, FIG. 1 depicts one or more caching servers 120, which may receive a response 114 and store the response 114 in a cache or other type of data storage. While FIG. 1 depicts the caching server(s) 120 as a separate computing device from the CDN server(s) 112 or web server(s) 108, in some implementations, a cache or other type of data storage may be associated with the CDN server(s) 112 or web server(s) 108 rather than with a separate computing device. Additionally, in other implementations, data may be stored in a cache associated with a user device 110, such as a cache associated with a browser application. Furthermore, while FIG. 1 depicts the CDN server(s) 112 providing the response 114 to the caching server(s) 120, in other implementations, the web server(s) 108 may provide the response to the caching server(s) 120.

In some implementations, the response 114 and caching determination 118 may be provided to one or more telemetry servers 122. The telemetry server(s) 122 may generate a telemetry log 124 based on at least a portion of the response 114. For example, a telemetry log 124 may include clickstream data indicative of interactions with content, data indicative of the content provided to a user device 110, and so forth. In some cases, the web server(s) 108 may provide a response 114 to the telemetry server(s) 122 in response to the caching determination 118 indicating that at least a portion of the response 114 is to be stored. In other cases, the web server(s) 108 may provide responses 114 to the telemetry server(s) 122 independent of the caching determination 118, and the telemetry server(s) 122 may, in response to a caching determination 118, determine a portion of the response 114 or associated request 104 to be stored. While FIG. 1 depicts the web server(s) 108 providing the response 114 to the telemetry server(s) 122, in other implementations, one or more of the CDN server(s) 112, caching server(s) 120, or user device 110 may provide data indicative of the response 114 to the telemetry server(s) 122. Additionally, in some implementations, the user device 110 may provide user telemetry data 126 indicative of data received by the user device 110 and interactions with received data to the telemetry server(s) 122. For example, when the user device 110 receives the response 114, the user device 110 may also receive data indicative of the caching determination 118, which may be used to determine at least a portion of the user telemetry data 126 provided to the telemetry server(s) 122. The data indicative of the caching determination 118 that is received by the telemetry server(s) 122 may also determine the particular user telemetry data 126 that is processed or included in a telemetry log 124. Similarly, the CDN server(s) 112 may provide CDN telemetry data 128 to the telemetry server(s) 122, which may indicate particular data that was sent, received, or cached by the CDN server(s) 112. The data indicative of the caching determination 118 that is received by the telemetry server(s) 122 may additionally determine the particular CDN telemetry data 128 that is processed or included in a telemetry log 124.

Association of the caching indication 116 with a request 104, by the CDN server(s) 112, may enable requests 104 associated with content suitable for storage and reuse, to be identified and processed by the web server(s) 108, without requiring this analysis to be performed by the web server(s) 108 for every received request 104. Association of the caching determination 118 with the response 114, by the web server(s) 108, may enable the particular data that is stored to be controlled by modifying configuration data associated with the web server(s) 108. Modifications to configuration data for the web server(s) 108 may typically be performed more quickly and immediately than modifying configuration data for the CDN server(s) 112, and modification to configuration data for a small number of web server(s) 108 may affect the data received from and provided to a potentially large number of CDN servers 112. Additionally, association of the caching determination 118 with the response 114, by the web server(s) 108, may enable the responses that are to be stored to be identified efficiently by the web server(s) 108 or the telemetry server(s) 122, such that the generation of telemetry log data may be limited to responses 114 that are stored.

Figure 2:
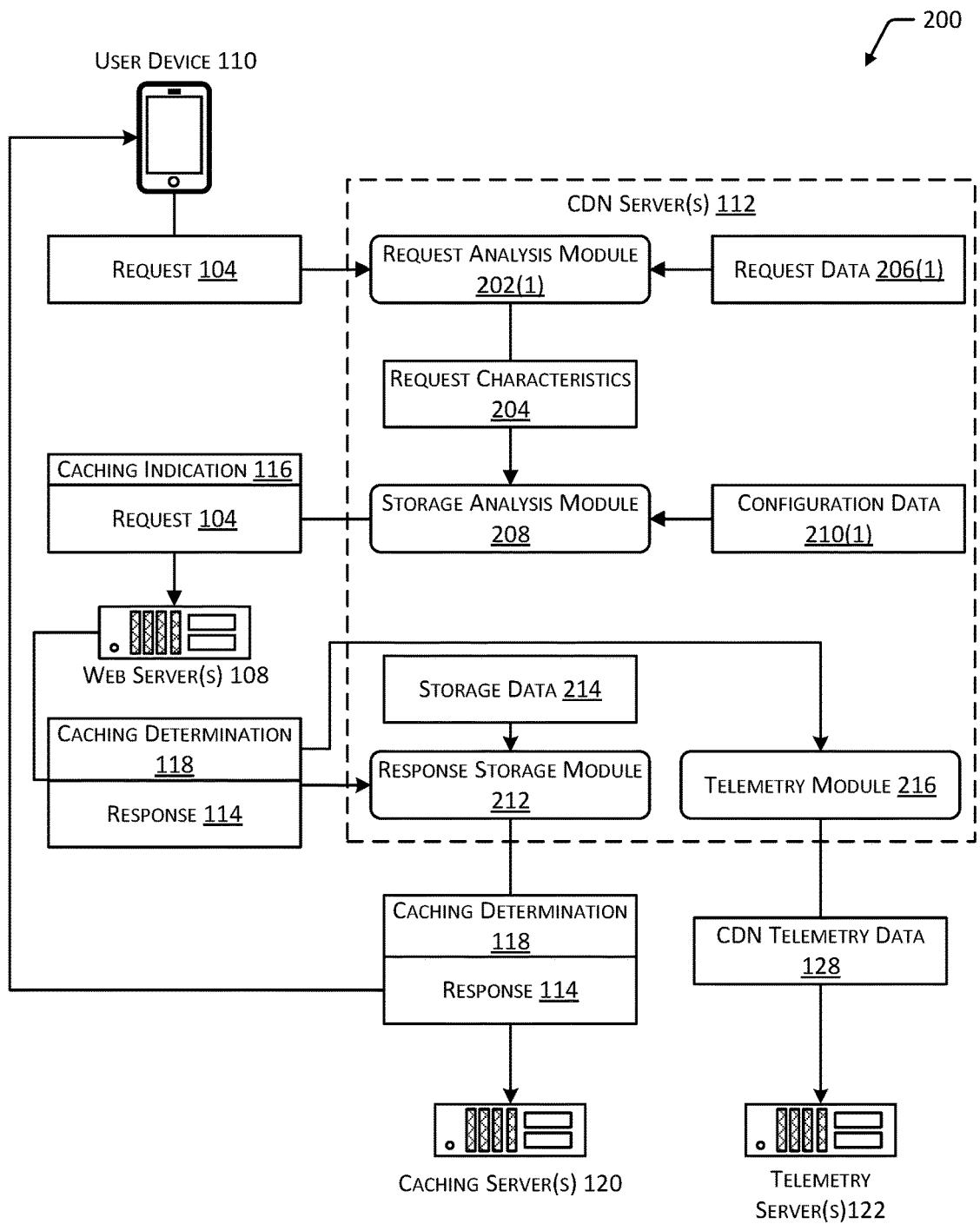
FIG. 2 is a block diagram depicting an implementation of interactions between one or more CDN servers and other components of the system.

FIG. 2 is a block diagram 200 depicting an implementation of interactions between one or more CDN servers 112 and other components of the system 100. As described with regard to FIG. 1, in response to a request 104 from a user device 110, one or more CDN servers 112 may associate a caching indication 116 with the request 104 and provide the request 104 and caching indication 116 to one or more web servers 108. The caching indication 116 may indicate that the request 104, or a response 114 associated with the request 104, is suitable for storage and reuse. The caching indication 116 may be generated based on characteristics of the request 104. Subsequently, the web server(s) 108 may provide a response 114 associated with a caching determination 118 to the CDN server(s) 112. The caching determination 118 may indicate whether the response 114 is to be stored, such as in a cache. In some cases, the caching determination 118 may indicate particular portions of the response 114 or an associated request 104 to be stored.

Based on the caching determination 118, the CDN server(s) 112, or in some implementations, the web server(s) 108, may provide at least a portion of the response 114 to one or more caching servers 120, or to another type of data storage.

A request analysis module 202(1) associated with the CDN server(s) 112 may determine request characteristics 204 based on a received request 104. Request characteristics 204 may include hardware or software components, or other properties of the user device 110, a user account associated with the request 104 or user device 110, a location associated with the user device 110 or user account, a transmission route (e.g., a network path) associated with the request 104, and so forth. Request characteristics 204 may also include a time or date that the request 104 is received, properties of the request 104 itself, properties of the data to which access is requested, and so forth. In some implementations, the request 104 may itself include or indicate one or more request characteristics 204. In other implementations, the request analysis module 202(1) may determine one or more request characteristics based on request data 206(1). For example, request data 206(1) may include user data or account data that associates a particular user account, location, configurations, settings, or preferences with a particular user device 110 or user account. As another example, request data 206(1) may indicate types of content associated with particular URLs or other types of identifiers. Continuing the example, request characteristics 204 may include characteristics of cookies, headers, or other data stored on the user device 110 or received from the user device 110. As another example, request data 206(1) may include an identifier that associates a user device 110 or user account with a control group or a treatment group of a statistical hypothesis test (e.g., an A/B test). Continuing the example, a user associated with one of a control group or a treatment group may be provided with a response 114 that is suitable for storage and reuse, while a second user associated with the other of the control group or the treatment group is provided with a personalized response 114 that is not suitable for storage and reuse. The identifier that associates a user device 110 or request 104 with a control group or treatment group may be used to determine whether a response 114 is stored. As such, one or more request characteristics 204 may be determined based on correspondence between the request 104 and request data 206(1). Request characteristics 204 may also include a determination regarding security or content associated with the request 104 or an associated response 114. For example, if a request 104 is determined to be anomalous, the request 104 and the associated response 114 may not be stored independent of the content or other characteristics of the request 104 or response 114. As another example, if an error occurs and the response 114 includes an indication of the error, the response 114 may not be stored independent of the characteristics of the request 104.

A storage analysis module 208 associated with the CDN server(s) 112 may generate a caching indication 116 based on the request characteristics 204. Specifically, configuration data 210(1) associated with the CDN server(s) 112 may associate particular request characteristics 204 or sets of request characteristics 204 with corresponding caching indications 116. For example, the configuration data 210(1) may include one or more rules, or a hierarchy of rules having different priority values, that associate types of content, times of day, components of user devices 110, and so forth with corresponding caching indications 116 indicative of whether a particular request 104 is associated with content suitable for storage and reuse. Continuing the example, a request 104 associated with access to non-personalized content may be associated with a caching indication 116 indicating that the request 104 corresponds to content suitable for storage and reuse. As another example, a request 104 that is received at a time of day that corresponds to peak traffic may be associated with a caching indication 116 indicating that the request 104 corresponds to content suitable for storage and reuse so that a stored version of a response 114 may be used to reduce load on the web server(s) 108. In some cases, if a request 104 is not associated with content suitable for storage and reuse, a caching indication 116 may not be generated. In other cases, if the request 104 is not associated with content suitable for storage and reuse, a caching indication 116 indicative of the lack of suitability may be generated. The request 104 and associated caching indication 116 may be provided to the web server(s) 108, which may generate a response 114 based on the request 104, or may provide the request 104 to one or more other computing devices for generation of a response 114.

In some implementations, the storage analysis module 208 or another module associated with the CDN server(s) 112 may determine one or more of a cache key or transmission route (e.g., a network path) associated with the request 104. Data indicative of the cache key or transmission route may also be included with the request 104 when the request 104 is provided to the web server(s) 108. In one implementation, the cache key or transmission route may be included, with the cache indication 116, in a header of the request 104. In some cases, the cache indication 116 itself may include data indicative of the cache key or transmission route. In other cases, the cache indication 116 may be determined based in part on the cache key or transmission route.

As described with regard to FIG. 1, the web server(s) 108 may associate a caching determination 118 with the response 114. The caching determination 118 may indicate whether the response 114, the associated request 104, or particular portions of the response 114 or request 104 are to be stored. A response storage module 212 associated with the CDN server(s) 112 may receive the response 114 and caching determination 118. In response to the caching determination 118, the response storage module 212 may cause the portion(s) of the response 114 or request 104 indicated in the caching determination 118 to be stored, such as by providing the response 114 to one or more caching servers 120. In some implementations, the response storage module 212 may access storage data 214 that associates caching determinations 118 with actions to be performed by the response storage module 212. For example, the storage data 214 may associate particular caches or other data storage locations with particular caching determinations 118, request characteristics 204, or characteristics of the response 114. In some implementations, the caching determination 118 or other data associated with the response 114 by the response storage module 212 may be provided to the caching server(s) 120. In other implementations, the response 114 or other data to be stored may be provided to the caching server(s) 120 by the response storage module 212, based on the caching determination 118, and the caching determination 118 may not necessarily be sent to the caching server(s) 120. The response 114 may also be provided by the CDN server(s) 112 to the user device 110.

A telemetry module 216 may generate CDN telemetry data 128 based on the data received by and the data generated by the CDN server(s) 112. For example, the CDN telemetry data 128 may include data indicative of one or more of the received request 104, the request characteristics 204, the caching indication 116 or other cache information 106 generated by the CDN server(s) 112, the response 114 or caching determination 118 received by the CDN server(s) 112, or the data transmitted to the user device 110 or caching server(s) 120 by the CDN server(s) 112. The CDN telemetry data 128 may be provided to the telemetry server(s) 122 for generation of one or more telemetry logs 124.

Figure 3:
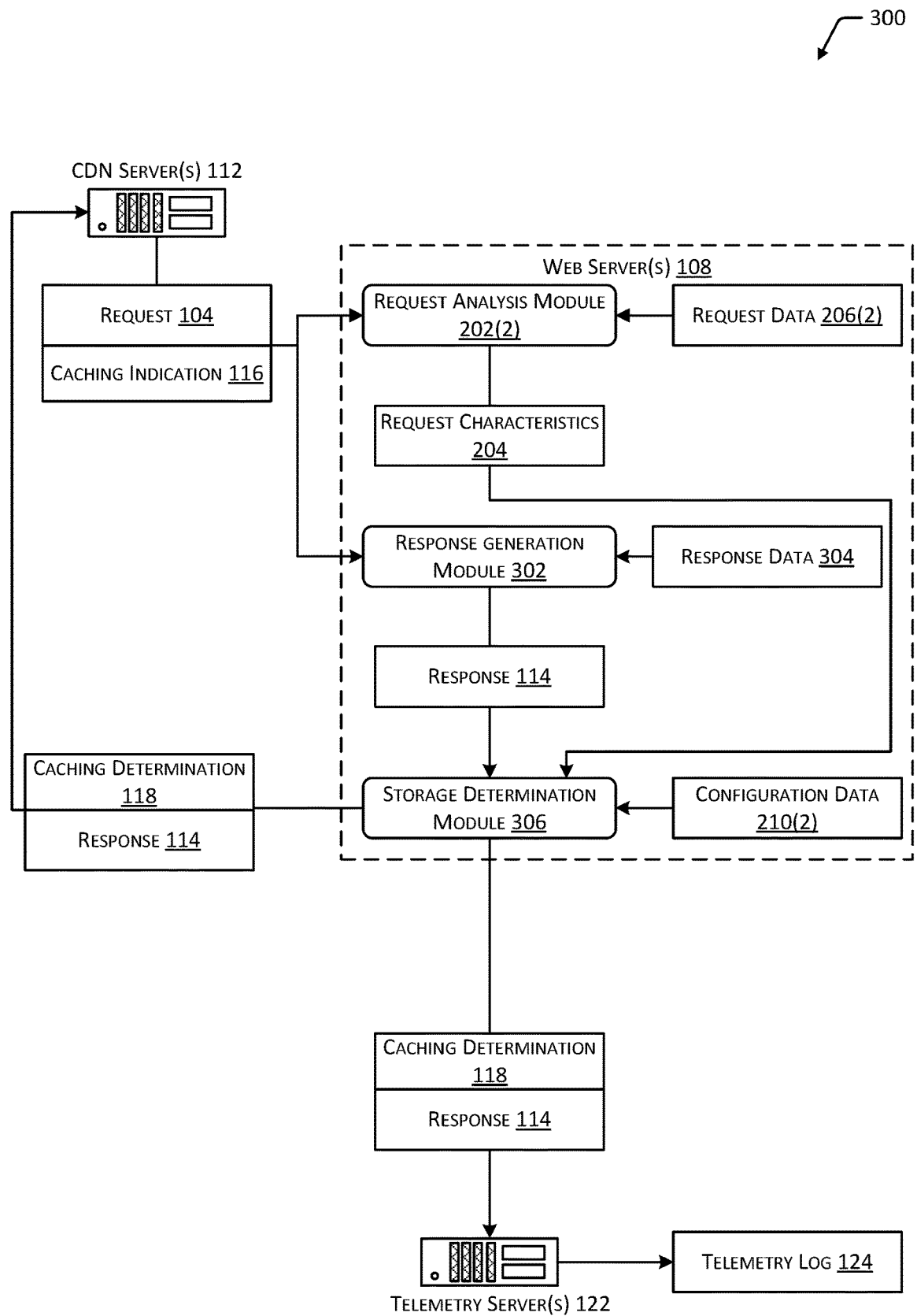
FIG. 3 is a block diagram illustrating an implementation of interactions between one or more web servers and other components of the system.

FIG. 3 is a block diagram 300 illustrating an implementation of interactions between one or more web servers 108 and other components of the system 100. As described with regard to FIGS. 1 and 2, in response to a request 104 from a user device 110, one or more CDN servers 112 may associate a caching indication 116 with the request 104 based on correspondence between configuration data 210(1) for the CDN server(s) 112 and request characteristics 204 of the request 104. The CDN server(s) 112 may then provide the request 104 and caching indication 116 to one or more web servers 108. In some implementations, the CDN server(s) 112 may also determine one or more of a cache key or transmission route, which may also be provided to the web server(s) 108. The caching indication 116 may indicate that the request 104, or a response 114 associated with the request 104, is suitable for storage and reuse. The web server(s) 108 may determine a response 114 based on the request 104, either directly or by providing at least a portion of the request 104 to one or more other computing devices for generation of the response 114. The web server(s) 108 may also generate a caching determination 118 based on the request characteristics 204 or characteristics of the response 114. The caching determination 118 may indicate whether the response 114 is to be stored, and in some cases may indicate particular portions of the response 114 or an associated request 104 to be stored. The response 114 and caching determination 118 may be provided to the CDN server(s) 112 for storage in a cache or other type of data storage. In some implementations, the response 114, and in some cases, the caching determination 118 may be provided to one or more telemetry servers 122 for generation of a telemetry log 124 based on at least a portion of the response 114.

A request analysis module 202(2) associated with the web server(s) 108 may receive a request 104 and an associated caching indication 116 from one or more CDN server(s) 112. The request analysis module 202(2) may determine request characteristics 204 based on one or more of the request 104 or the caching indication 116. In some cases, the request characteristics 204 determined by the web server(s) 108 may be the same as those determined by the CDN server(s) 112. For example, the request 104 may include data indicative of the request characteristics 204, or the caching indication 116 generated by the CDN server(s) 116 may include data indicative of the request characteristics 204. As another example, the request analysis module 202(2) may determine the request characteristics 204 based on the request 104 or the caching indication 116, and in some cases based on request data 206(2) that associates request characteristics 204 with particular user accounts, locations, user devices 110, or other properties of the request 104. In other cases, the request characteristics 204 determined by the web server(s) 108 may differ from those determined by the CDN server(s) 112. For example, the request data 206(2) associated with the web server(s) 108 may associate different request characteristics 204 with different properties of the request 104, caching indication 116, user device 110, and so forth. In some implementations, the web server(s) 108 may determine one or more request characteristics 204 based on the caching indication 116 itself, or based on a cache key or transmission route associated with the request 104 by the CDN server(s) 112.

The web server(s) 108 may also include a response generation module 302, which may generate a response 114 based on the request 104. In other implementations, the web server(s) 108 may provide the request 104, and in some implementations, the caching indication 116 or a caching determination 118 determined by the web server(s) 108, to one or more other computing devices which may generate the response 114. The response generation module 302 may determine correspondence between the request 104 and response data 304 and may generate the response 114 based on this correspondence. In some cases, the response generation module 302 may determine correspondence between the caching indication 116 and the response data 304, or between the request characteristics 204 and the response data 304 to determine data for inclusion in the response 114.

A storage determination module 306 associated with the web server(s) 108 may generate a caching determination 118 that indicates whether the response 114, the request 104, or particular portions of the response 114 or request 104 are to be stored. The storage determination module 306 may generate the caching determination 118 based on configuration data 210(2) associated with the web server(s) 108. The configuration data 210(2) may include one or more rules, or a hierarchy of rules having different priority values, that associate various request characteristics 204 or characteristics of the response 114 with corresponding caching determinations 118.

The response 114 and associated caching determination 118 may be provided to the CDN server(s) 112, which, as described with regard to FIGS. 1 and 2, may cause portions of the response 114 or associated request 104 to be stored based on the caching determination 118. Additionally, data indicative of the response 114, and in some implementations, the caching determination 118 may be provided to one or more telemetry server(s) 122 to cause generation of a telemetry log 124 indicative of at least a portion of the response 114.

In some implementations, if a request 104 is not associated with a caching indication 116 or is associated with a caching indication 116 that indicates that content associated with the request 104 is not suitable for storage or reuse, one or more steps performed by the storage determination module 306 or the request analysis module 202(2) may be omitted. For example, a response 114 may be generated without a caching determination 118 or with a caching determination 118 indicating that the response 114 is not to be stored. In such a case, the response 114 may be provided to the user device 110 without providing the response 114 to one or more caching servers 120, and in some cases, without providing the response 114 to the telemetry server(s) 122.

Figure 4A:
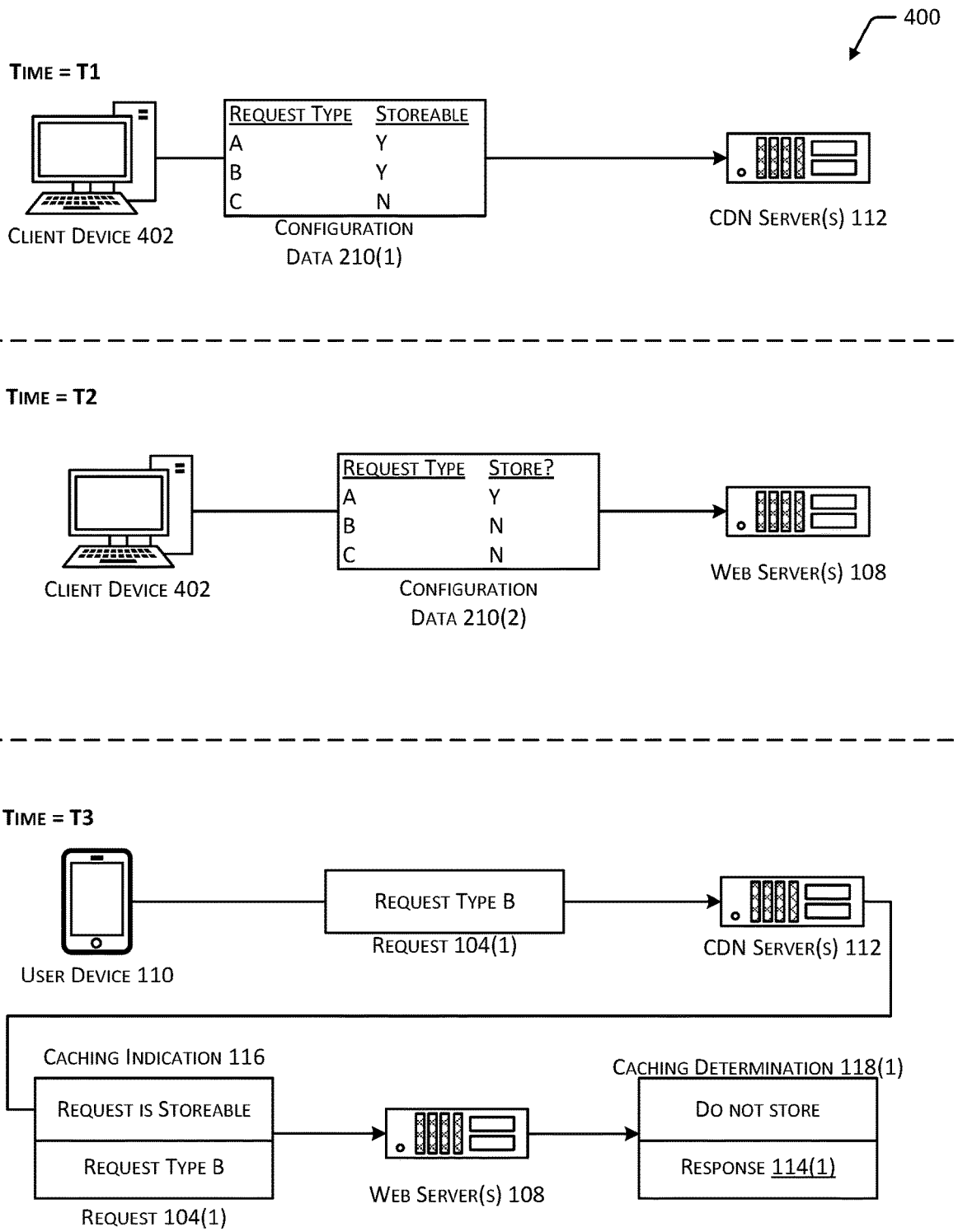
FIGS. 4A and 4B are is a series of diagrams illustrating an implementation of a method for configuring a CDN server and a web server to selectively store or refrain from storing responses based on configuration data for the web server.
Figure 4B:
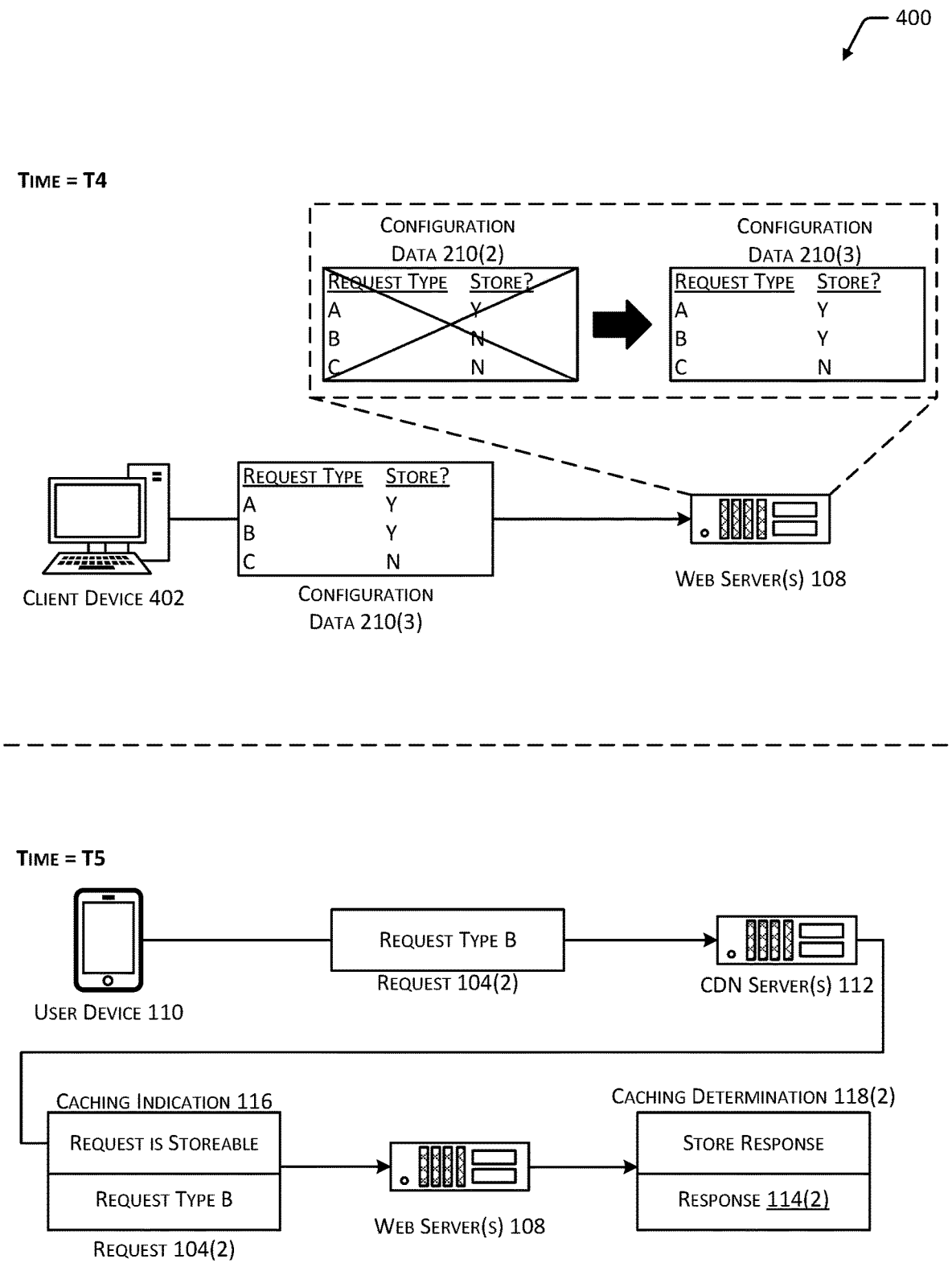

FIGS. 4A and 4B are is a series of diagrams 400 illustrating an implementation of a method for configuring a CDN server 112 and a web server 108 to selectively store or refrain from storing responses 114 based on configuration data 210 for the web server 108. At a first time T1, first configuration data 210(1) may be provided to one or more CDN server(s) 112. A client device 402, which may include any number and any type of computing devices including, without limitation, those described with regard to the user device 110, web server(s) 108, and CDN server(s) 112, may receive input indicative of the configuration data 210(1). The client device 402 may provide the first configuration data 210(1) to one or multiple CDN server(s) 112. In some implementations, the first configuration data 210(1) may be provided to the CDN server(s) 112 via a web server 108 or other intermediate computing device. In other implementations, the first configuration data 210(1) may be provided directly to the CDN server(s) 112. A CDN server 112 typically functions as an "edge" device that may be located remote from the web server(s) 108 used to generate responses 114 and remote from client devices 402 operated by an administrator of a website associated with the web server(s) 108. In such a case, providing configuration data 210(1) to a CDN server 112 may utilize significant time and computational resources, and providing configuration data 210(1) to multiple CDN servers 112 may increase the time and resources used. Additionally, an administrator or other user associated with a website may have more information regarding the configuration and operations of a web server 108 and may not have similar information with regard to the configuration and operations of a CDN server 112 or other edge device. FIG. 4A depicts the first configuration data 210(1) associating particular request characteristics 204 with an indication regarding whether content associated with a request 104 is suitable for storage and reuse. For example, the first configuration data 210(1) may associate various "request types" (e.g., one possible request characteristic 204) with corresponding caching indications 116, such as an indication regarding whether a request 104 or associated response 114 is "storable". In the example shown in FIG. 4A, the first configuration data 210(1) indicates that request types "A" and "B" are associated with a positive caching indication 116 (e.g., an association with content suitable for storage and reuse), while the request type "C" is associated with a negative caching indication 116 or a lack of a caching indication 116.

At a second time T2, second configuration data 210(2) may be provided to the web server(s) 108. The second configuration data 210(2) may associate request characteristics 204, such as an indication of various "request types" with corresponding caching determinations 118, which may include an indication regarding whether a response 114 or associated request 104 is to be stored. In some cases, providing configuration data 210(2) from a client device 402 to the web server(s) 108 may be accomplished using less time and computational resources than providing configuration data 210(1) to the CDN server(s) 112. For example, an administrator associated with a website may directly access a web server 108 or may access a computing device geographically proximate to the web server 108 to provide configuration data 210(2). While FIG. 4A depicts the second time T2 subsequent to the first time T1, in other implementations, the first configuration data 210(1) may be provided to the CDN server(s) 112 subsequent to providing the second configuration data 210(2) to the web server(s) 108, or at the same time that the second configuration data 210(2) is provided. FIG. 4A depicts the second configuration data 210(2) associating the request type "A" with a positive caching determination 118 (e.g., indicating that a response 114 associated with the request type is to be stored), and associating the request types "B" and "C" with a negative caching determination 118 or a lack of a caching determination 118.

At a third time T3, a request 104(1) may be received by the CDN server(s) 112. As described with regard to FIGS. 1-3, a user device 110 or other type of computing device may provide a request 104, which may first be received at an edge device, such as a CDN server 112. The CDN server(s) 112 may associate a caching indication 116 with the request 104(1) based on correspondence between the request characteristics 204 of the request 104(1) and the first configuration data 210(1). For example, FIG. 4A depicts the request 104(1) including a "request type" of "B", which corresponds to a positive caching indication 116 in the first configuration data 210(1). Based on this correspondence, the caching indication 116 associated with the request 104(1) may indicate that the request 104(1) is associated with content suitable for storage and reuse.

The CDN server(s) 112 may provide the request 104(1) and caching indication 116 to the web server(s) 108, which may generate a response 114(1) or cause another computing device to generate the response 114(1). In response to the positive caching indication 116, the web server(s) 108 may determine correspondence between the request characteristics 204 and the second configuration data 210(2). For example, FIG. 4A depicts the second configuration data 210(2) associating the request type "B" with a negative caching determination 118(1). As a result, the caching determination 118(1) associated with the response 114(1) includes an indication that the response 114(1) is not to be stored. If the received request 104(1) were not associated with a positive caching indication 116, the web server(s) 108 may instead generate a response 114 without accessing the second configuration data 210(2) or generating a caching determination 118(1).

At a fourth time T4, shown in FIG. 4B, third configuration data 210(3) may be provided to the web server(s) 108 to replace or modify the second configuration data 210(2). For example, the client device 402 is shown providing configuration data 210(3) in which the request types "A" and "B" are associated with a positive caching determination 118, while the request type "C" is associated with a negative caching determination 118 or a lack of a caching determination 118. While FIG. 4B depicts the third configuration data 210(3) replacing the second configuration data 210(2), in other implementations, the third configuration data 210(3) may be generated by adding data to the second configuration data 210(2), removing data from the second configuration data 210(2), or modifying at least a portion of the second configuration data 210(2).

At a fifth time T5, a subsequent request 104(2) may be received by the CDN server(s) 112. FIG. 4B depicts the subsequent request 104(2) including the same request characteristic 204 as the previous request 104(1), the request type "B". Because the first configuration data 210(1) provided to the CDN server(s) 112 has not been changed, the CDN server(s) 112 may associate a positive caching indication 116 with the subsequent request 104(2) due to the subsequent request 104(2) having the same request characteristic 204. However, because the configuration data 210(3) for the web server(s) 108 has been modified, the web server(s) 108 may associate a different caching determination 118(2) with the subsequent request 104(2). For example, FIG. 4B depicts the web server(s) 108 associating a positive caching determination 118(2) with a response 114(2) generated based on the request 104(2).

As such, by changing the configuration data 210 associated with the web server(s) 108, the particular responses 114 and requests 104 that are stored may be modified without modifying the configuration data 210 associated with the CDN server(s) 112. While in some cases, the configuration data 210 associated with the CDN server(s) 112 may be modified in addition to or in place of modifying the configuration data 210 associated with the web server(s) 108, modifying the configuration data 210 associated with the web server(s) 108 may typically be accomplished more quickly and more frequently, using less time and computational resources.

Figure 5:
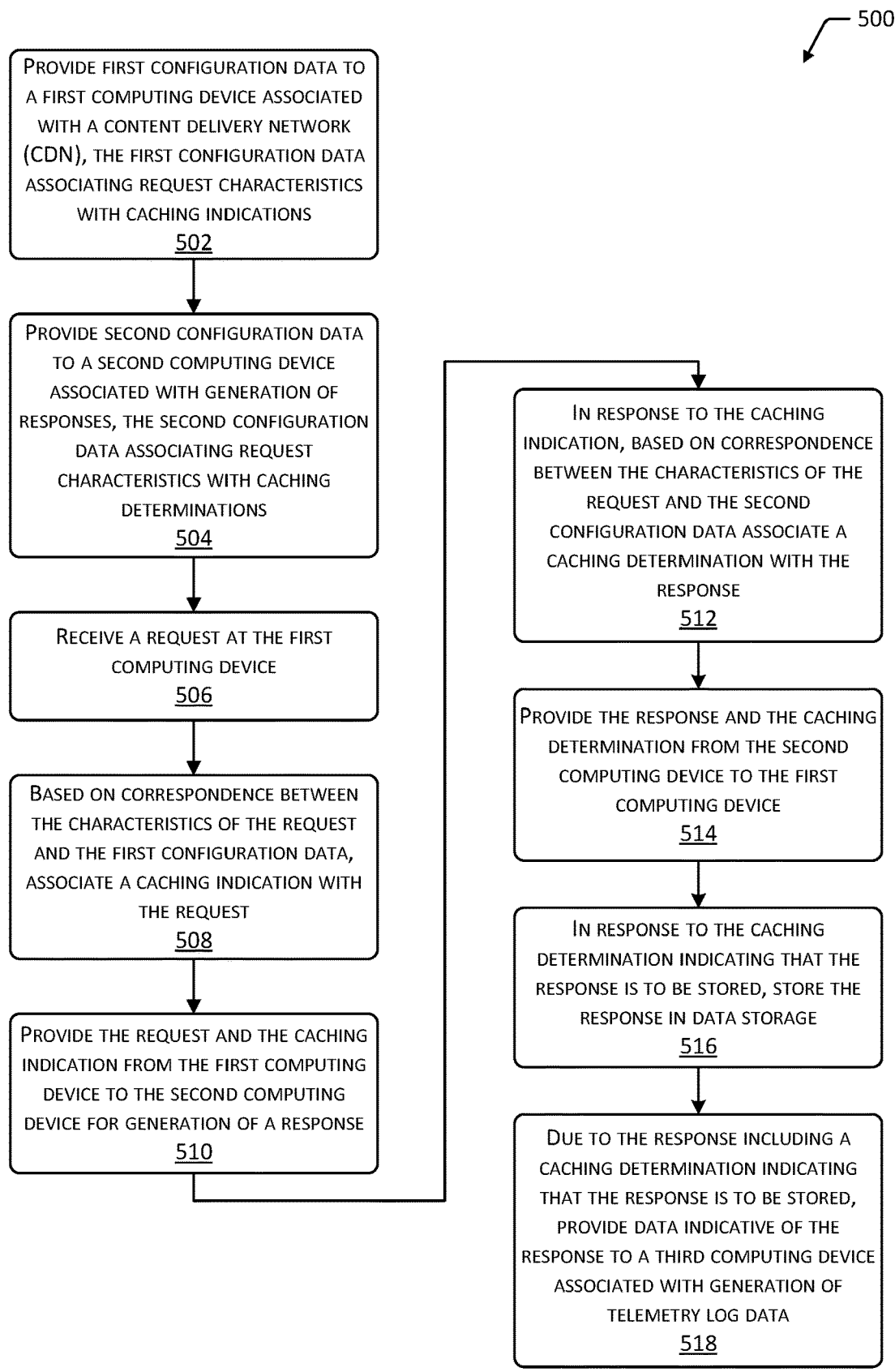
FIG. 5 is a flow diagram illustrating an implementation of a method for controlling the storage of responses based on configuration data for a web server.

FIG. 5 is a flow diagram 500 illustrating an implementation of a method for controlling the storage of responses 114 based on configuration data 210 for a web server 108. At 502, first configuration data 202(1) may be provided to a first computing device associated with a CDN, such as one or more CDN servers 112. The first configuration data 202(1) may associate request characteristics 204 with corresponding caching indications 116. For example, based on characteristics of a device or user account providing a request 104, a time of day, latency or other communication metrics, or characteristics of a request 104 itself, such as the type of data to which access is requested, particular caching indications 116 may be associated with the request 104 to indicate whether the request 104 is associated with content that may be suitable for storage and reuse. The first configuration data 210(1) may configure a CDN server 112 or other computing device to determine particular request characteristics 204 and associate caching indications 116 with requests 104, such as by adding a caching indication 116 to a header of a request 104 or modifying the header of a request 104 to include a caching indication 116.

At 504, second configuration data 210(2) may be provided to a second computing device associated with generation of responses 114, such as one or more origin servers, web servers 108, or other computing devices in communication with an origin server or web server 108. The second configuration data 210(2) may associate request characteristics 204 with caching determinations 118. The request characteristics 204 of the second configuration data 210(2) may differ from those indicated in the first configuration data 210(1), or may be identical. Caching determinations 118 may include an indication of whether a particular request 104 or associated response 114 is to be stored in a cache or other type of data storage. In some implementations, the caching determination 118 may indicate particular data to be stored, such as a portion of a response 114, and particular data storage to be used, such as a particular cache having a selected time to live (TTL) for the stored data.

At 506, a request 104 may be received at the first computing device. For example, a user device 110 or another type of computing device may provide a request 104 to access particular content, such as a webpage of a website, to a CDN server 112, or other type of computing device. Continuing the example, a request 104 is typically received by an "edge" device prior to being received by a web server 108. Use of a CDN server 112 as an edge device may enable responses 114 that include data from a cache associated with the CDN server 112 to be generated using data from the cache, such that this data is not generated and transmitted by the web server 108, conserving time and computational resources.

At 508, based on correspondence between the characteristics of the request 104 and the first configuration data 210(1), a caching indication 116 may be associated with the request 104. As described with regard to FIGS. 1-4, a CDN server 112 or other type of computing device may determine the characteristics of a request 104 based on the request 104 itself or other sources of data, including data stored in association with the CDN server 112, the web server(s) 108, or other computing devices in communication with the CDN server 112 or web server(s) 108. Based on the first configuration data 210(1), a particular caching indication 116 that corresponds to the determined request characteristics 204 may be added to a header of the request 104 or otherwise associated with the request 104.

At 510, the request 104 and caching indication 116 may be provided from the first computing device to the second computing device for generation of a response 114. For example, a CDN server 112 may provide a request 104 to an origin server, a web server 108, or another computing device, which may generate a response 114 based on the request 104 or may provide the request 104, portions of the request 104, or additional requests 104 to one or more other computing devices to cause generation of the response 114.

At 512, in response to the caching indication 116, based on the correspondence between the characteristics of the request 104 and the second configuration data 210(2), a caching determination 118 may be associated with the response 114. As described with regard to FIGS. 1-4, a web server 108 or other type of computing device may determine the characteristics of a request 104 based on the request 104 itself or other sources of data. The second configuration data 210(2) may associate particular request characteristics 204 or sets of request characteristics 204 with corresponding caching determinations 118 indicating whether a response 114 is to be stored.

At 514, the response 114 and the caching determination 118 may be provided from the second computing device to the first computing device. For example, prior to transmitting a response 114 to the user device 110 or other computing device that provided the request 104, the response 114 may be transmitted to a CDN server 112, which may store at least a portion of the response 114 in a cache or other type data storage based at least in part on the caching determination 118. The CDN server 112 may in turn transmit the response 114 to the user device 110 or other computing device that provided the request 104.

At 516, in response to the caching determination 118 indicating that the response 114 is to be stored, the response 114 may be stored in data storage. In some implementations, the response 114 may be stored by the first computing device in data storage associated with the first computing device. In other implementations, the response 114 may be provided to other computing devices, such as a caching server 120, which may store the response 114. In some cases, only portions of the response 114, such as particular components of a webpage, may be stored. In other cases, an entire webpage or entire response 114 may be stored.

At 518, due to the response including a caching determination 118 indicating that the response 114 is to be stored, data indicative of the response 114 may be provided to a third computing device associated with generation of telemetry log data. For example, one or more telemetry servers 122 may receive data indicative of a response 114 that was stored in a cache or other data storage, as indicated by the caching determination 118, and may generate a clickstream log or other type of telemetry log 124 indicative of the response 114. At a subsequent time when data from the cache or other data storage is used to generate a response 114, the telemetry log 124 associated with the data from the cache or other data storage may be used to represent the data that was provided to the requesting device.

Figure 6:
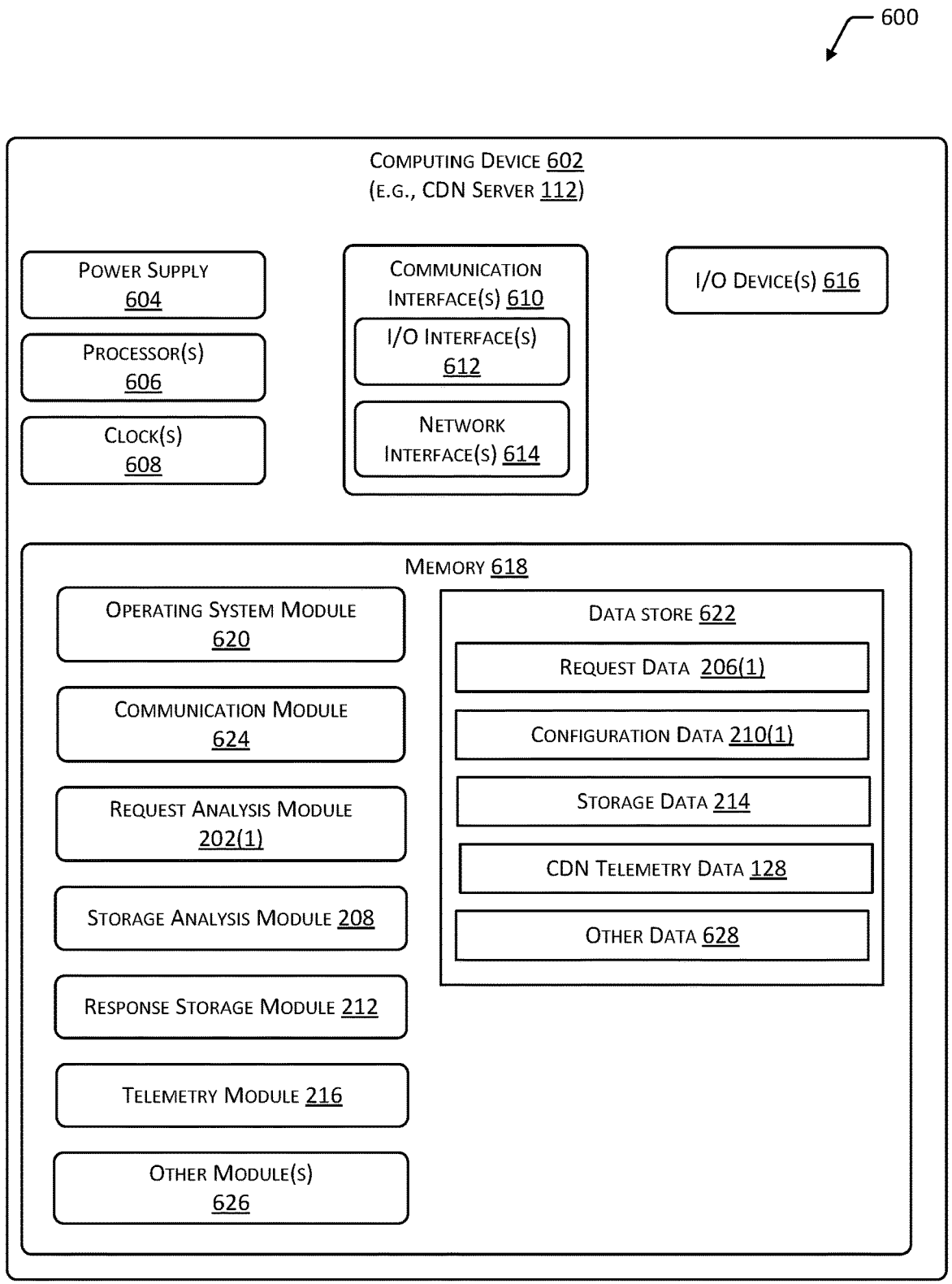
FIG. 6 is a block diagram depicting an implementation of a computing device for receiving and processing requests, such as one or more servers associated with a CDN, within the present disclosure.

FIG. 6 is a block diagram 600 depicting an implementation of a computing device 602 for receiving and processing requests 104, such as one or more servers associated with a CDN, within the present disclosure. For example, the computing device 602 may include one or more CDN servers 112 or other computing devices 602 in communication with the CDN server(s) 112. As such, while FIG. 6 depicts a single block diagram 600 of a computing device 602, any number and any type of computing devices 602 may be used to perform the functions described herein. While FIG. 6 depicts an example implementation of a CDN server 112, in some cases, all or a portion of the functions described herein with regard to the CDN server(s) 112 may be performed by one or more web servers 108, user devices 110, or other computing devices 602 in communication therewith. Additionally, in some implementations, all or a portion of the functions described with regard to the user device 110 and web server(s) 108 may be performed by one or more CDN servers 112, or one or more other computing devices 602 in communication with a user device 110, web server 108, or CDN server 112.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input devices or output devices associated with the computing device 602. For example, I/O devices 616 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 616 may be physically incorporated with the computing device 602. In other implementations, I/O devices 616 may be externally placed.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, 5G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the request analysis module 202(1). The request analysis module 202(1) may determine request characteristics 204 of a received request 104 based on the data included in the request 104, and in some cases, based on request data 206(1) stored in association with the computing device 602. For example, request data 206(1) may include device data that associates a device identifier included in a request 104 with properties of the device that provided the request 104, such as a location of the device, hardware or software components of the device, a user account associated with the device, and so forth. Request data 206(1) may include user data indicating characteristics of a user or user account associated with the request 104. Request data 206(1) may also indicate the types of data associated with a request 104. The request characteristics 204 of a received request 104 may be used to determine whether the request 104 or an associated response 114 is suitable for storage and reuse.

The memory 618 may additionally store the storage analysis module 208. The storage analysis module may determine correspondence between the request characteristics 204 of received requests 104 and configuration data 210(1) and associate a caching indication 116 with the request 104. The configuration data 210(1) may associate caching indications 116 with corresponding request characteristics 204 or sets of request characteristics 204. A caching indication 116 may indicate whether a request 104 or an associated response 114 is suitable for storage and reuse. After a caching indication 116 is associated with a request 104, the request 106 may be provided to another computing device 602 for generation of a response 114, and subsequently, the response 114 may be received. For example, as described with regard to FIGS. 1-5, a web server 108 or other type of computing device 602 may receive a request 104, generate a response 114, and associate a caching determination 118 with the response 114. The web server 108 may then provide the response 114 and caching determination 118 to the computing device 602.

The memory 618 may also store the response storage module 212. The response storage module 212 may, based on the caching determination 118, cause at least a portion of the response 114 or other data to be stored in a cache or another type of data storage. For example, the caching determination 118 may indicate particular data to be stored or particular data storage that is to be used to store respective portions of the data. Based on the caching determination 118, the response storage module 212 may store particular data in selected data storage or may transmit the data to other computing devices 602 for storage.

The memory 618 may additionally store the telemetry module 216, which may generate CDN telemetry data 128 for transmission to one or more telemetry servers 122. The CDN telemetry data 128 may include data indicative of one or more of received requests 104, determined characteristics of requests 104, determined caching indications 116 or other cache information 106, received responses 114 or caching determinations 118, data transmitted to other computing devices 602, and so forth.

Other modules 626 may also be present in the memory 618. For example, other modules 626 may include modules for identifying characteristics of computing devices 602 that provide requests 104, encryption modules to encrypt and decrypt communications between computing devices 602, authentication modules to authenticate communications sent or received by computing devices 602, a permission module to assign, determine, and manage user permissions to access or modify configuration data 210 or other data associated with computing devices 602, modules for receiving and modifying configuration data 210, and so forth.

Other data 628 within the data store(s) 622 may include configurations, settings, preferences, and default values associated with computing devices 602. Other data 628 may also include encryption keys and schema, access credentials, and so forth. Other data 628 may also include network data indicative of networks and other computing devices 602 accessible to the computing device 602, device data indicative of such computing devices 602, user data indicative of users or user accounts associated with computing devices 602, and so forth.

In different implementations, different computing devices 602 may have different capabilities or capacities. For example, CDN servers 112 may have greater processing capabilities or data storage capacity than user devices 110.

Figure 7:
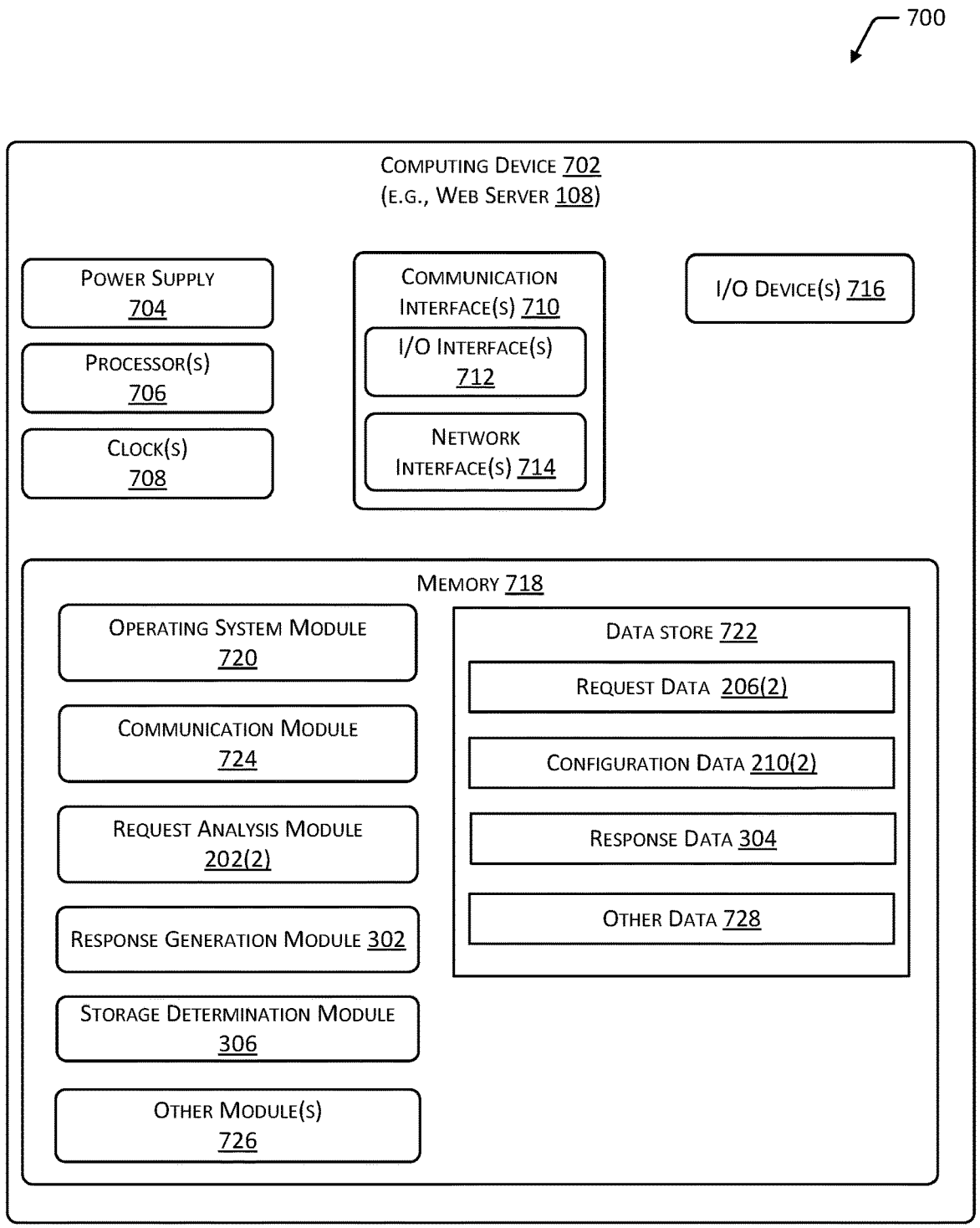
FIG. 7 is a block diagram depicting an implementation of a computing device for generating and determining storage of responses, such as one or more web servers, within the present disclosure.

FIG. 7 is a block diagram 700 depicting an implementation of a computing device 702 for generating and determining storage of responses 114, such as one or more web servers 108, within the present disclosure.

The power supply 704, processor(s) 706, clock(s) 708, communication interface(s) 710, I/O device(s) 716, memory 718, OS module 720, data store 722, communication module 724, other module(s) 726, and other data 728 associated with the computing device 702, shown in FIG. 7, may be of the same or similar type as those described with regard to the computing device 602 of FIG. 6. Additionally, while FIG. 7 depicts a single block diagram 700 of a computing device 702, any number and any type of computing devices 702 may be used to perform the functions described herein.

The memory 718 of the computing device 702 may store a request analysis module 202(2), which may analyze a request 104 and in some cases a caching indication 116 received from another computing device 602 to determine request characteristics 204 of the request 104. In some implementations, the request analysis module 202(2) may access request data 206(2) indicative of properties of a device that provides a request 104, a user or user account associated with the request 104, properties of the request 104 itself, and so forth. For example, the request data 206(2) may associate request characteristics 204 with properties of a requesting device, user account, or request 104.

The memory 718 may also store the response generation module 302, which may generate a response 114 based on a received request 104 and response data 304. For example, a request 104 may include an identifier associated with particular content, data indicative of properties of a requesting device, user account, and so forth, and the response generation module 302 may determine correspondence between these properties and the response data 304 to determine particular data for inclusion in a response 114.

The memory 718 may additionally store the storage determination module 306, which may associate caching determinations 118 with responses 114 based on correspondence between characteristics of the responses 114 or associated requests 104 and configuration data 210(2). For example, the configuration data 210(2) may associate particular request characteristics 204 or sets of request characteristics 204 with caching determinations 118 indicative of whether a response 114 is to be stored.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive a request using a first computing device, wherein the request includes a request characteristic;
access, by the first computing device, first configuration data that associates the request characteristic with a caching indication, wherein the caching indication indicates that a response associated with the request includes a type of data;
determine, using the first computing device and based on the request characteristic and the first configuration data, a transmission route, a cache key, and the caching indication;
associate, using the first computing device, a first header with the request, wherein the first header includes an indication of the transmission route, the cache key, and the caching indication;
provide the request from the first computing device to a second computing device associated with generation of the response;
access, by the second computing device, second configuration data that associates one or more of the request characteristic, the transmission route, the cache key, or the caching indication with a first caching determination indicating that the response associated with the request is to be cached;
generate the response using the second computing device;
in response to the caching indication indicating that the response includes the type of data, associate, using the second computing device, a second header with the response, wherein the second header includes an indication of the first caching determination;
provide the response from the second computing device to the first computing device; and
in response to the first caching determination indicating that the response associated with the request is to be cached, store one or more of the response or the request in data storage associated with the first computing device.

2. The system of claim 1, further comprising computer-executable instructions to:
in response to the first caching determination, provide the response and telemetry data from the first computing device to a third computing device;
based on the response and the telemetry data, generate telemetry log data associated with the one or more of the response or the request stored in the data storage; and
store the telemetry log data.

3. The system of claim 1, wherein at a first time, third configuration data associated with the second computing device associates the one or more of the request characteristic, the transmission route, the cache key, or the caching indication with a second caching determination indicating that the response associated with the request is not to be cached, the system further comprising computer-executable instructions to:
receive, at a second time after the first time, one or more of the second configuration data to replace the third configuration data or a modification to the third configuration data to form the second configuration data; and
associate the second configuration data with the second computing device.

4. A system comprising:
a first computing device comprising:
one or more memories storing computer-executable instructions; and
one or more hardware processors to execute the computer-executable instructions to:
receive a request;
determine a first characteristic of the request;
determine correspondence between the first characteristic and first configuration data that associates characteristics of requests with caching indications;
based on the correspondence between the first characteristic and the first configuration data, associate a caching indication with the request, wherein the caching indication indicates that one or more of at least a portion of the request or at least a portion of a response associated with the request is associated with a type of data;
provide the request and the caching indication to a second computing device;
receive a response from the second computing device, wherein the response includes a caching determination that indicates a first configuration to store the one or more of the at least a portion of the request or the at least a portion of the response; and
based on the caching determination received from the second computing device indicating the first configuration, store the one or more of the at least a portion of the request or the at least a portion of the response.

5. The system of claim 4, wherein the first characteristic includes one or more of:
a first identifier indicative of a third computing device from which the request was received;
a second identifier indicative of a user account associated with the request;
a user type associated with the user account;
one or more of a hardware component or a software component associated with the third computing device;
a location associated with the third computing device;
a location associated with a fourth computing device that provided the request to the third computing device;
a transmission route by which the request was received from the third computing device;

a type of content associated with the response;
a time at which the request was received; or
an identifier associated with the request.

6. The system of claim 4, further comprising computer-executable instructions associated with the second computing device to:
generate the response;
determine correspondence between:
one or more of the caching indication or the first characteristic; and
second configuration data that associates the caching determination with the one or more of the caching indication or the first characteristic; and
in response to the correspondence between the second configuration data and the one or more of the caching indication or the first characteristic, associate the caching determination with the response.

7. The system of claim 6, further comprising computer-executable instructions associated with the second computing device to:
at a first time, receive third configuration data that associates the one or more of the caching indication or the first characteristic with a non-caching determination that indicates a second configuration to refrain from storing the one or more of the at least a portion of the request or the at least a portion of the response;
at a second time subsequent to the first time, receive the second configuration data that associates the caching determination with the one or more of the caching indication or the first characteristic; and
replace the third configuration data with the second configuration data;
wherein the request is received subsequent to the second time.

8. The system of claim 4, further comprising computer-executable instructions to:
in response to the caching determination, provide the response to a third computing device, wherein the third computing device generates telemetry log data based on at least a portion of the response and stores the telemetry log data.

9. The system of claim 8, wherein the caching determination includes an indication of the first characteristic, the telemetry log data is generated further in response to the first characteristic, and the telemetry log data includes the indication of the first characteristic.

10. The system of claim 4, further comprising computer-executable instructions to:
determine, based on the first characteristic, one or more of a cache key or a transmission route; and
provide, to the second computing device, the one or more of the cache key or the transmission route in association with the request and the caching indication.

11. The system of claim 10, wherein the caching indication and the one or more of the cache key or the transmission route are included in a header of the request.

12. The system of claim 4, further comprising computer-executable instructions to:
receive, at a first time, second configuration data, wherein the second configuration data lacks an association between the first characteristic and the caching indication; and
receive, at a second time subsequent to the first time, one or more of: the first configuration data or a modification to the second configuration data to form the first configuration data;
wherein the request is received subsequent to the second time.

13. A system comprising:
a first computing device comprising:
one or more memories storing computer-executable instructions; and
one or more hardware processors to execute the computer-executable instructions to:
receive, from a second computing device, a request and a caching indication indicating that a response associated with the request includes a type of data;
determine the response based on the request;
in response to the caching indication indicating that the response includes the type of data, determine correspondence between a first characteristic of the request and first configuration data that associates characteristics of requests with a caching determination, wherein the caching determination indicates a configuration to store one or more of at least a portion of the response or at least a portion of the request; and
provide the response and the caching determination to one or more of the second computing device or a third computing device, wherein the caching determination indicating the configuration causes the one or more of the second computing device or the third computing device to store the one or more of the at least a portion of the response or the at least a portion of the request.

14. The system of claim 13, wherein the first characteristic includes one or more of:
a time associated with the request;
a location associated with a fourth computing device that provided the request to the second computing device;
a transmission route by which the request was received from the fourth computing device; or
a latency associated with communication with the fourth computing device.

15. The system of claim 13, wherein the first characteristic includes one or more of:
a first identifier associated with one or more of: a fourth computing device associated with the request or a user account associated with the request; or
a second identifier that associates the one or more of the fourth computing device or the user account with one of a control group or a treatment group associated with a statistical hypothesis test.

16. The system of claim 13, further comprising computer-executable instructions associated with the second computing device to:
receive the request from a fourth computing device;
determine the first characteristic based on the request;
determine correspondence between the first characteristic and second configuration data that associates the first characteristic with the caching indication;
based on the correspondence between the first characteristic and the second configuration data, associate the caching indication with the request;
receive the response and the caching determination from the first computing device; and
in response to the caching determination, store the one or more of the at least a portion of the response or at least a portion of the request.

17. The system of claim 13, further comprising computer-executable instructions to:
provide the response to a fourth computing device, wherein in response to the caching determination, the fourth computing device generates telemetry log data based on the at least a portion of the response and stores the telemetry log data.

18. The system of claim 17, wherein the caching determination includes an indication of one or more of the first characteristic or a portion of the first configuration data that caused the one or more of the at least a portion of the response or the at least a portion of the request to be stored, and the telemetry log data includes the indication of the one or more of the first characteristic or the portion of the first configuration data.

19. The system of claim 13, wherein the caching indication further includes one or more of a cache key or a transmission route associated with the request, and wherein the first configuration data further associates the one or more of the cache key or the transmission route with the caching determination.

20. The system of claim 13, further comprising computer-executable instructions to:
- at a first time, receive second configuration data that lacks an association between the first characteristic and the caching determination; and
- at a second time subsequent to the first time, receive the first configuration data that associates the caching determination with the first characteristic;
- wherein the request is received subsequent to the second time.

* * * * *

UNITED STATES PATENT AND TRADEMARK OFFICE
CERTIFICATE OF CORRECTION

PATENT NO. : 11,418,818 B1
APPLICATION NO. : 16/676796
DATED : August 16, 2022
INVENTOR(S) : Jui Te Tseng et al.

It is certified that error appears in the above-identified patent and that said Letters Patent is hereby corrected as shown below:

On the Title Page

Item (56) References Cited, add:
U.S. Patent Pub. No. 2019/0230385 ("Beck").

Signed and Sealed this
Twentieth Day of September, 2022

Katherine Kelly Vidal
*Director of the United States Patent and Trademark Office*